United States Patent
Sa et al.

(10) Patent No.: US 11,584,417 B2
(45) Date of Patent: Feb. 21, 2023

(54) HANDLE ASSEMBLY FOR CART WITH POWER ASSIST FUNCTION AND CART HAVING THE SAME

(71) Applicant: LG ELECTRONICS INC., Seoul (KR)

(72) Inventors: Jaecheon Sa, Seoul (KR); Sunryang Kim, Seoul (KR); Keunsik No, Seoul (KR); Kangsoo Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 371 days.

(21) Appl. No.: 16/757,887

(22) PCT Filed: May 7, 2019

(86) PCT No.: PCT/KR2019/005427
§ 371 (c)(1),
(2) Date: Apr. 21, 2020

(87) PCT Pub. No.: WO2020/226198
PCT Pub. Date: Nov. 12, 2020

(65) Prior Publication Data
US 2021/0229724 A1    Jul. 29, 2021

(51) Int. Cl.
*B62B 5/06* (2006.01)
*B62B 5/00* (2006.01)
*G01D 5/14* (2006.01)
*G01L 5/22* (2006.01)

(52) U.S. Cl.
CPC .............. *B62B 5/0073* (2013.01); *B62B 5/06* (2013.01); *G01D 5/145* (2013.01); *G01L 5/22* (2013.01)

(58) Field of Classification Search
CPC ........ B62B 5/0073; B62B 5/06; G01D 5/142; G01D 5/145; G01D 5/16
See application file for complete search history.

(56) References Cited

U.S. PATENT DOCUMENTS

| | | | |
|---|---|---|---|
| 2014/0345956 A1* | 11/2014 | Kojina | B62B 5/0073 180/19.1 |
| 2014/0358344 A1* | 12/2014 | Katayama | A61G 5/048 701/22 |
| 2015/0066274 A1* | 3/2015 | Hijikata | B62B 5/0073 180/19.1 |
| 2015/0066275 A1* | 3/2015 | Masaki | B62B 5/0073 180/19.1 |
| 2015/0066277 A1* | 3/2015 | Kojina | B62B 5/0033 180/19.1 |
| 2017/0001656 A1* | 1/2017 | Katayama | A61H 3/04 |
| 2018/0118245 A1* | 5/2018 | Chung | B62B 5/0043 |

(Continued)

FOREIGN PATENT DOCUMENTS

| | | |
|---|---|---|
| JP | 11-262111 A | 9/1999 |
| JP | 2015-231756 A | 12/2015 |

(Continued)

*Primary Examiner* — Jeffrey J Restifo
(74) *Attorney, Agent, or Firm* — Birch, Stewart, Kolasch & Birch, LLP

(57) ABSTRACT

A handle assembly for a cart with a power assist function can sense the direction that a user's force is applied, and provide assist power in the corresponding direction, such that the user can easily move the cart. A cart including the handle assembly allows the user to conveniently move the cart.

18 Claims, 10 Drawing Sheets

(56) References Cited

U.S. PATENT DOCUMENTS

| | | | | |
|---|---|---|---|---|
| 2018/0178823 A1* | 6/2018 | Yang | .......................... | A61L 2/10 |
| 2020/0262460 A1* | 8/2020 | Kim | ..................... | B62B 5/0073 |
| 2020/0393831 A1* | 12/2020 | Kim | ..................... | G05D 1/0221 |
| 2021/0011484 A1* | 1/2021 | Park | ....................... | B62B 5/0096 |
| 2021/0155278 A1* | 5/2021 | Raja | ....................... | B62B 5/0036 |
| 2021/0213994 A1* | 7/2021 | Sa | ........................... | B62B 3/001 |
| 2021/0229722 A1* | 7/2021 | Sa | ........................... | B62B 3/001 |
| 2021/0229723 A1* | 7/2021 | Sa | ............................ | B62B 5/06 |
| 2021/0229724 A1* | 7/2021 | Sa | ......................... | B62B 5/0073 |
| 2021/0229725 A1* | 7/2021 | Sa | ......................... | B62B 5/0073 |

FOREIGN PATENT DOCUMENTS

| | | |
|---|---|---|
| KR | 10-2013-0056879 A | 5/2013 |
| KR | 10-1300942 B1 | 8/2013 |
| KR | 10-1892004 B1 | 8/2018 |

* cited by examiner

[FIG. 1]
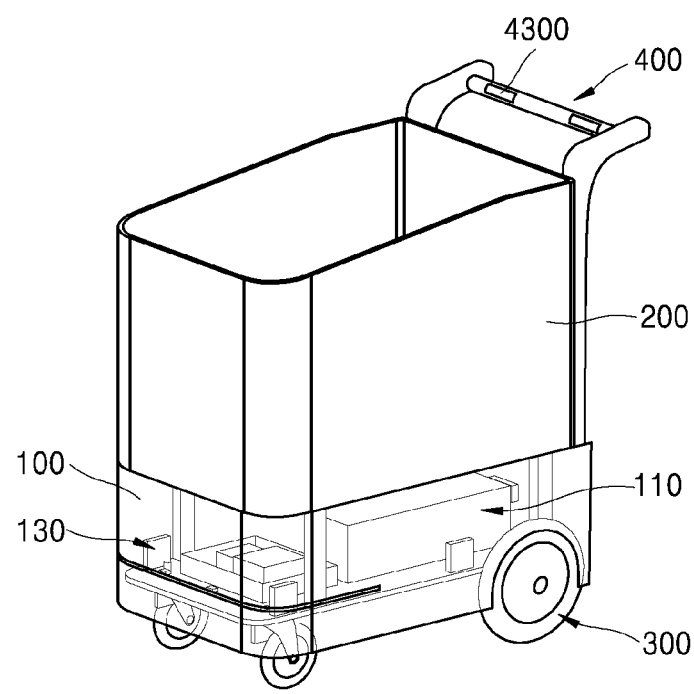

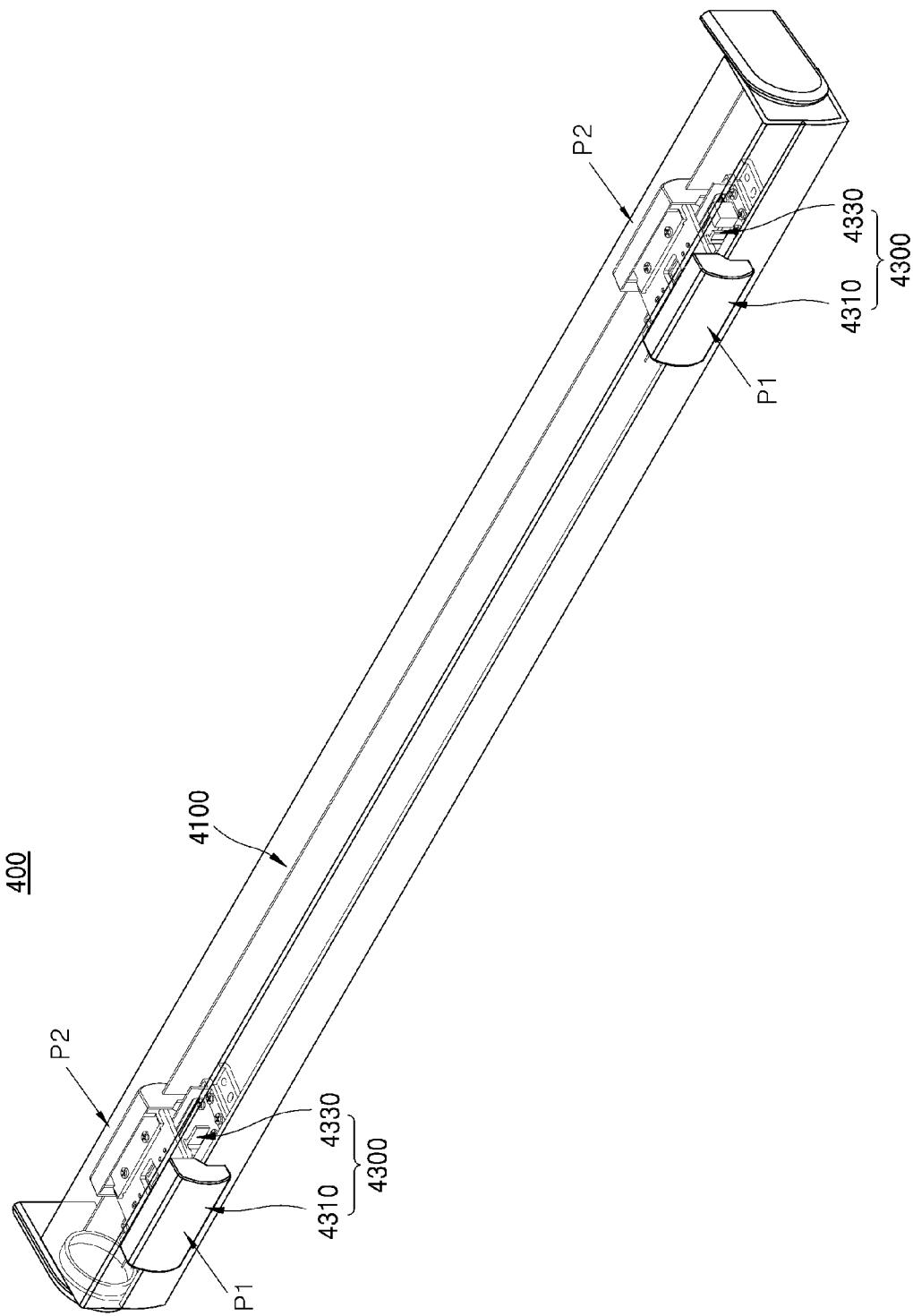

[FIG. 3]
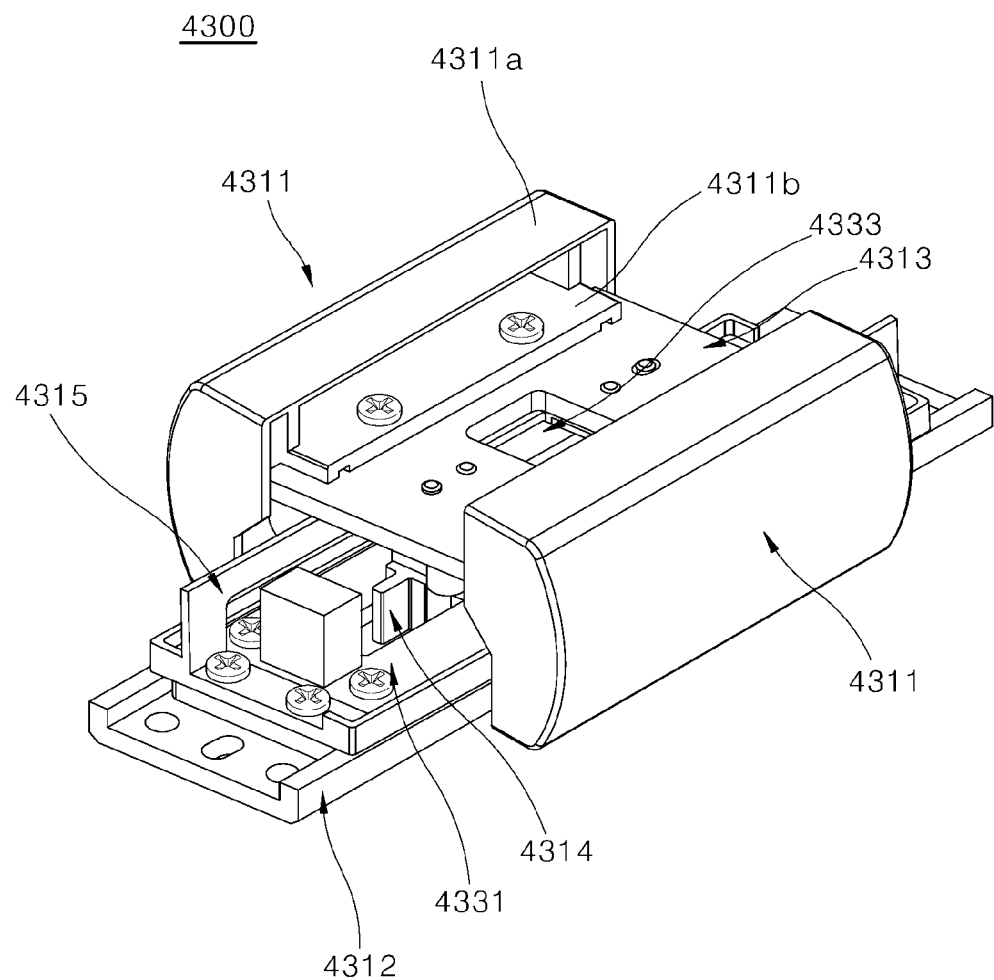

[FIG. 4]
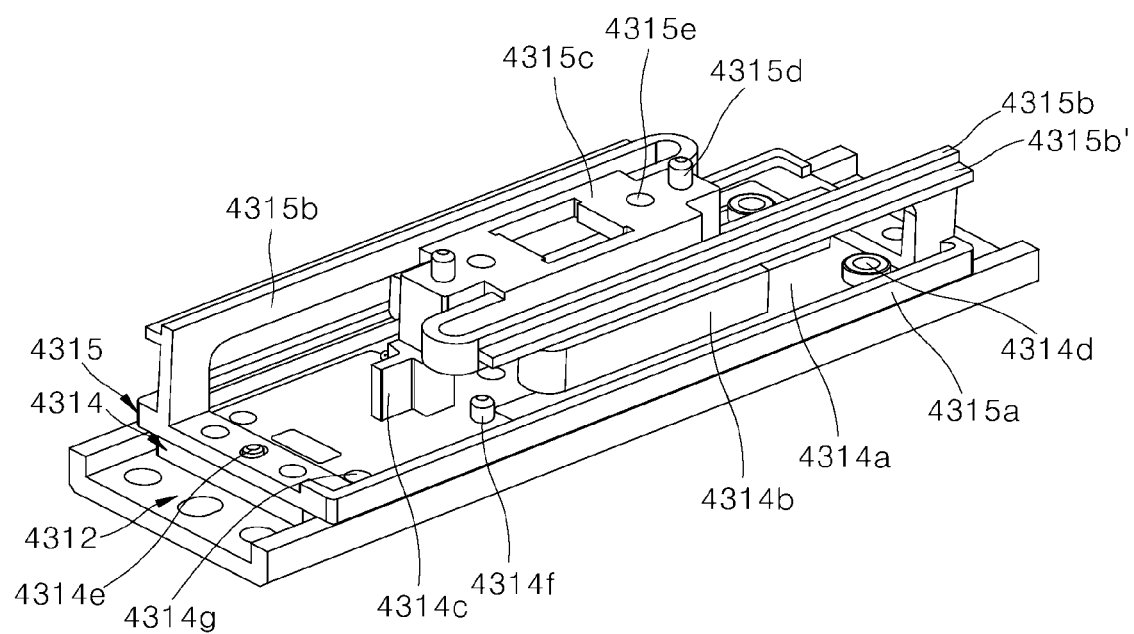

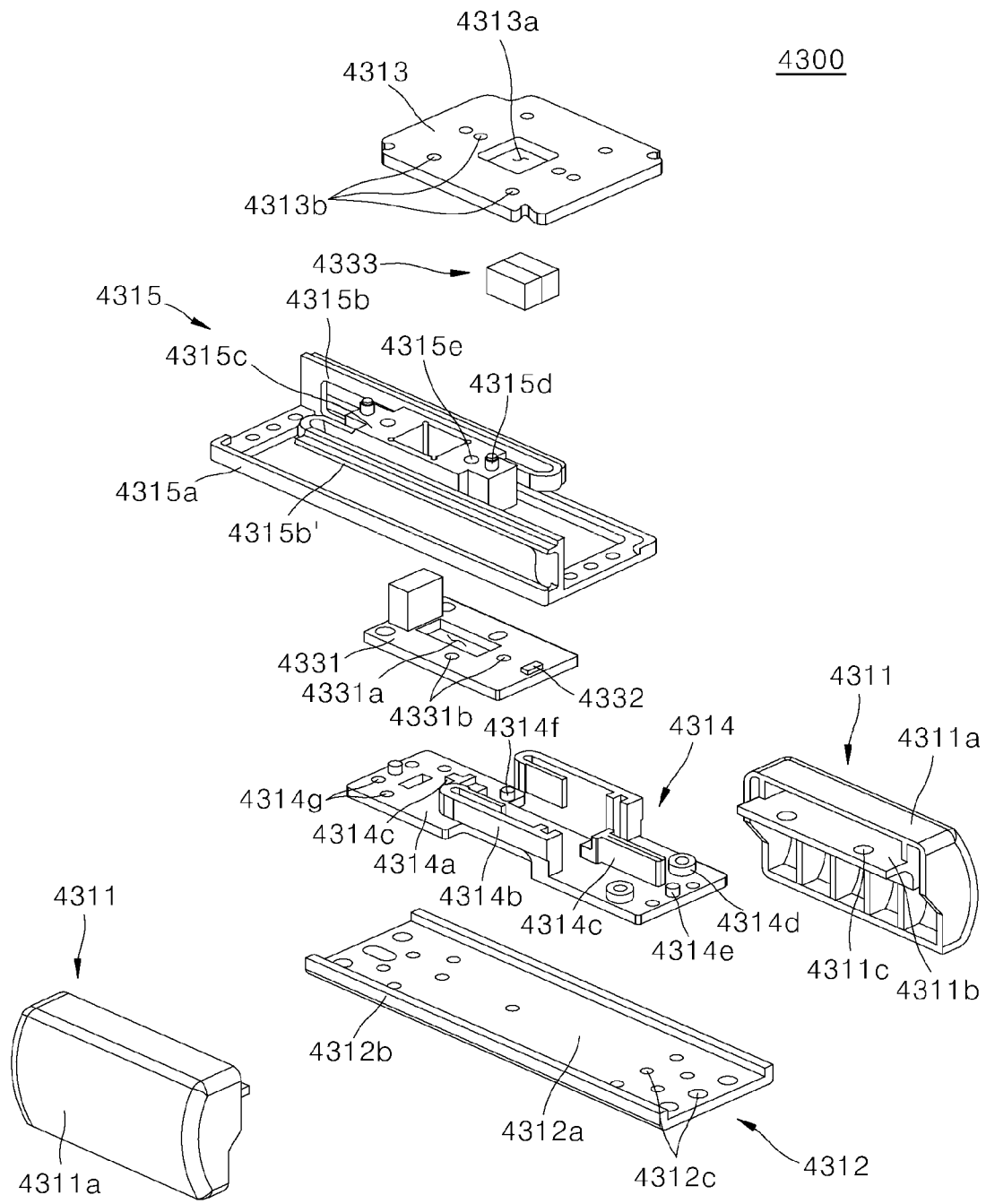
[FIG. 5]

[FIG. 6]
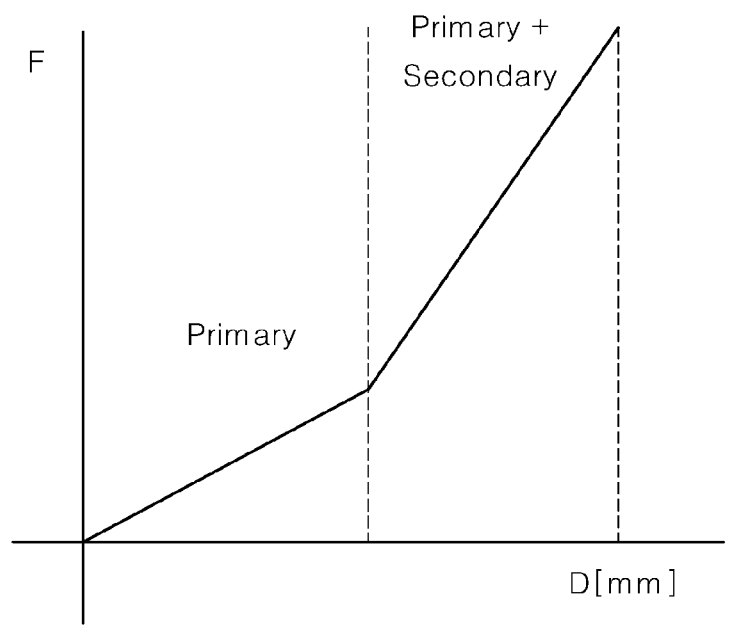

[FIG. 7]
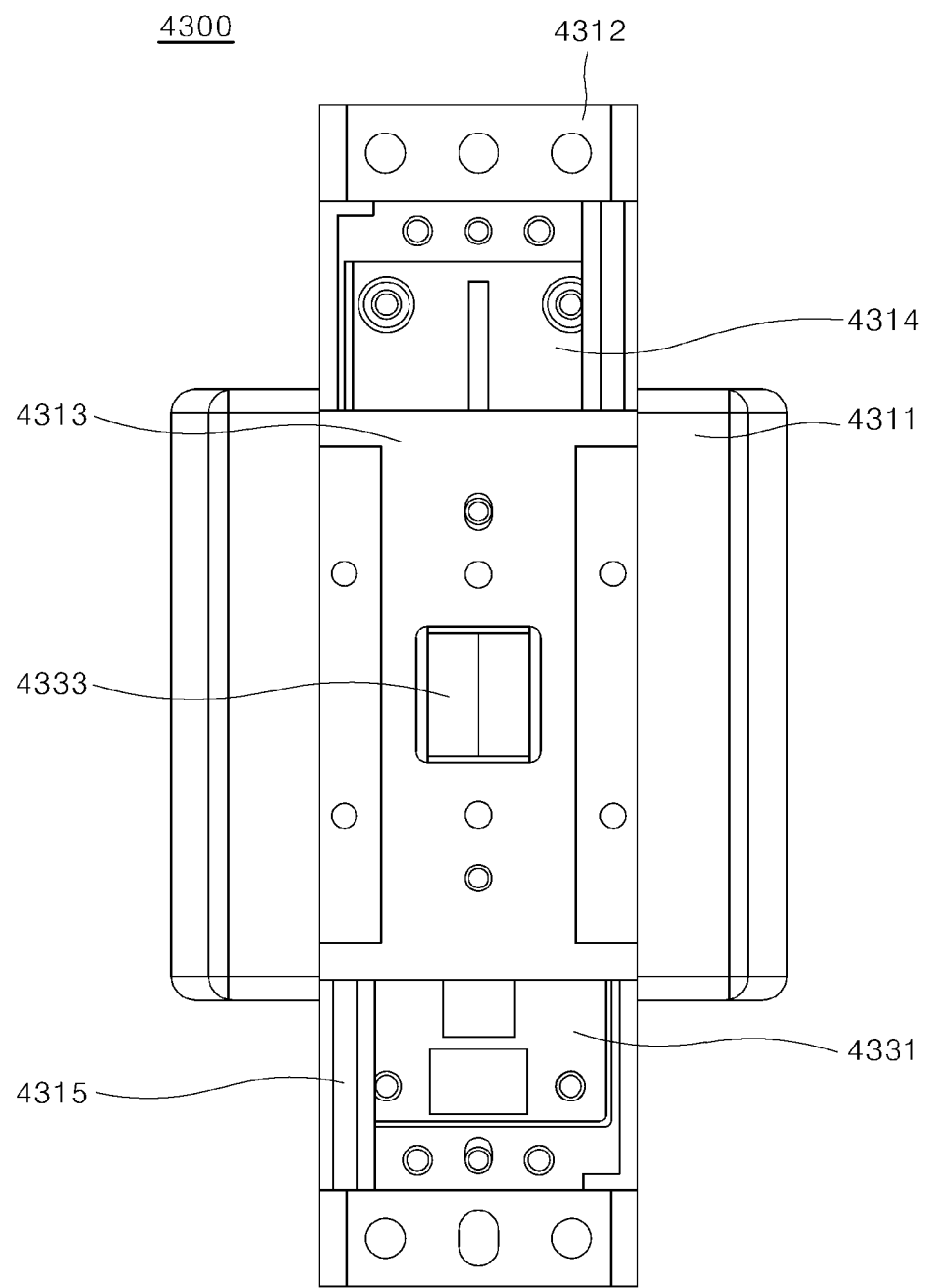

[FIG.8]
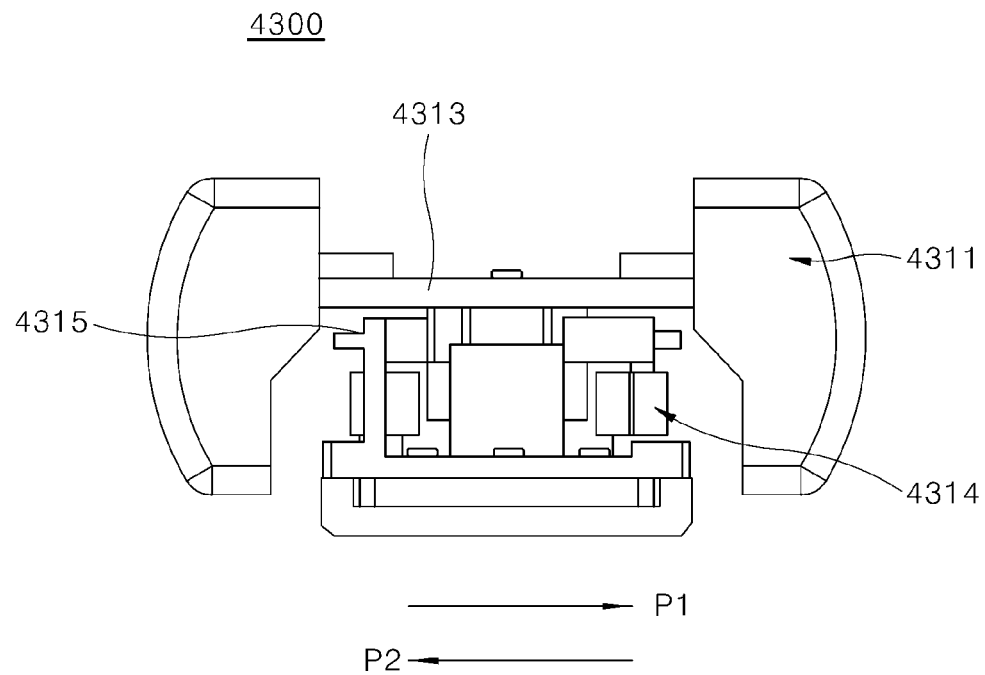
[FIG.9]
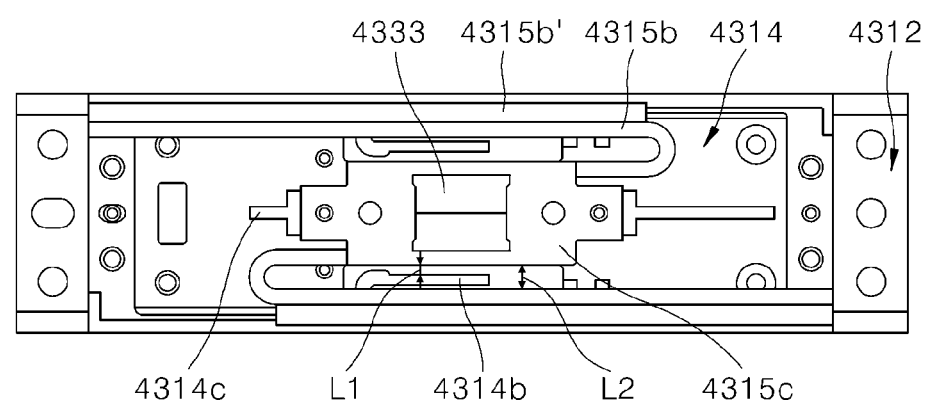

[FIG.10]
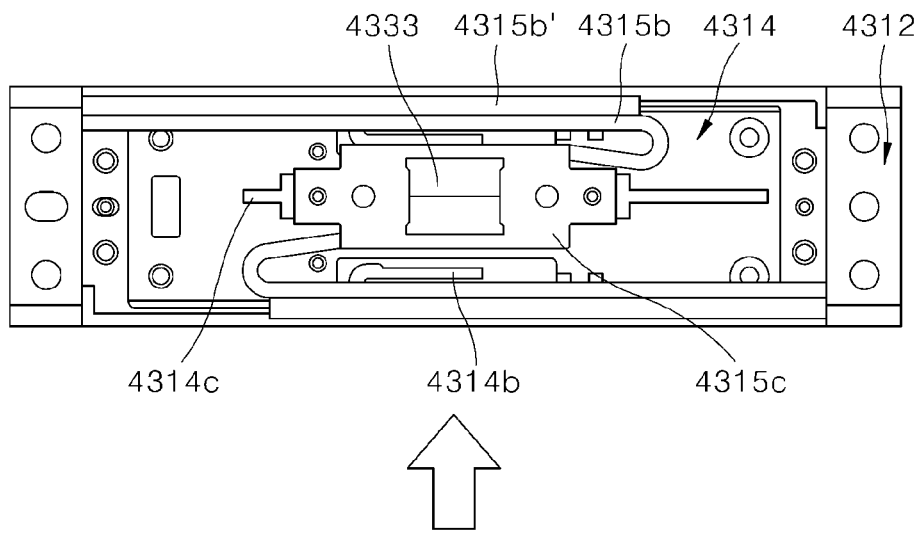
[FIG.11]
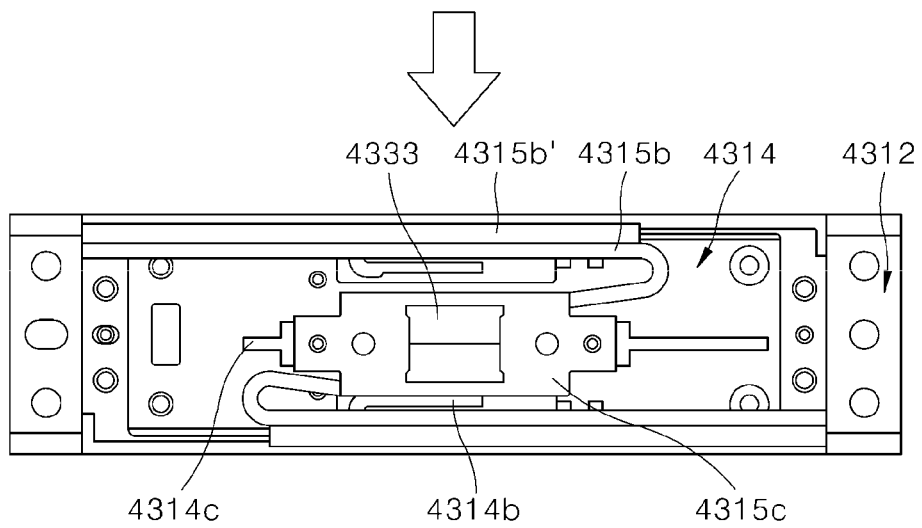

[FIG.12]
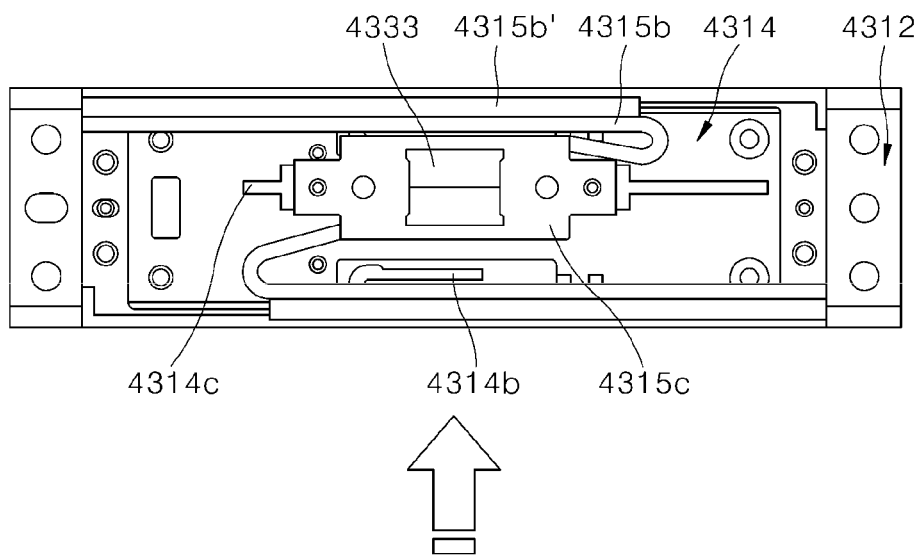
[FIG.13]
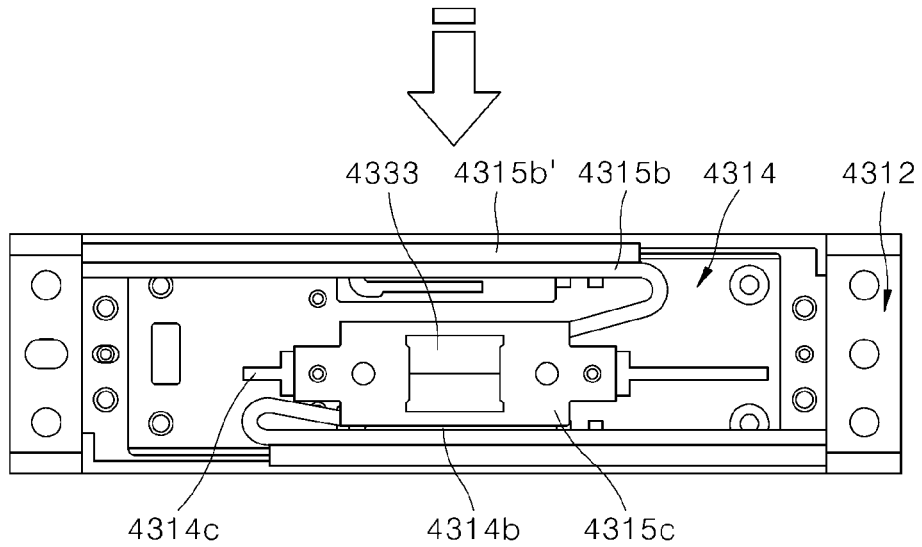

HANDLE ASSEMBLY FOR CART WITH POWER ASSIST FUNCTION AND CART HAVING THE SAME

CROSS-REFERENCE TO RELATED APPLICATIONS

This application is the National Phase of PCT International Application No. PCT/KR2019/005427 filed on May 7, 2019, the contents of which are hereby expressly incorporated by reference into the present application.

TECHNICAL FIELD

The present disclosure relates to a handle assembly for a cart with a power assist function and a cart having the same.

BACKGROUND ART

In a large retail store, a department store, an airport and the like, various types of carts are used for users to carry heavy objects or luggage.

A cart used in a space for shopping, such as a large retail store or department store, has a plurality of wheels installed at the bottom of a basket for storing items, and is moved by a user who pushes or pulls a handle. As a cart used in an airport, a similar cart to the above-described cart or a cart which additionally has a brake function may be used.

Since the cart enables a user to move without carrying a large quantity of items or heavy items in person, the cart is necessary for the user's convenience. However, when a large quantity of items or a heavy item needs to be carried on the cart, the user needs to apply a large force to move the cart, even though the cart is used.

When a sensor is applied to sense the direction of a force applied to move the cart, vibration occurs in the vertical direction as well as the front-to-back direction depending on the movement of the cart, because the cart is operated on the ground. Therefore, complex control may be required for accurate sensing. Thus, there is a need for the development of a cart which can avoid complex control while accurately sensing a force applied to the cart.

DISCLOSURE

Technical Problem

Various embodiments are directed to a handle assembly for a cart with a power assist function, which can sense the direction that a user's force is applied, and provide assist power in the corresponding direction, such that the user can easily move the cart, and the cart.

Also, various embodiments are directed to a handle assembly for a cart with a power assist function, which can accurately sense the direction that a user's force is applied, with a simple structure, and provide assist power in the corresponding direction, and the cart.

The purposes of the present disclosure are not limited to the above-described purposes, and other purposes and advantages of the present disclosure, which are not described herein, will be understood by the following descriptions, and clarified by embodiments of the present disclosure. Furthermore, it will be obvious that the purposes and advantages of the present disclosure can be realized by units described in claims and combinations thereof.

Technical Solution

In an embodiment, a handle assembly for a cart may include: a handle bar which is installed on one side of the cart, and to which an external force applied in a movement direction of the cart is inputted; and a force sensing assembly (module) including: a frame supporter installed on the handle bar and moved in the direction of the external force inputted to the handle bar; and a force sensor unit installed adjacent to the frame supporter and configured to sense the movement direction of the frame supporter and divide the magnitude of the external force applied to the frame supporter into a plurality of stages to sense the external force.

The force sensor unit may include: a magnet coupled to one side of the frame supporter, and moved in a direction corresponding to the direction of the external force by the frame supporter; a Hall sensor installed adjacent to the magnet, and configured to sense the position of the magnet; and a sensor printed circuit board (PCB) having the Hall sensor mounted thereon, and configured to determine the direction of the external force based on the sensing result of the Hall sensor.

The frame supporter may include: a base frame installed on the handle bar; a pair of cover pads installed over the base frame, and at least partially exposed to the front and rear of the handle bar; a first moving bracket installed between the base frame and the cover pad, and including a plurality of primary springs each having one end set to a fixed end and the other end set to a free end; and a second moving bracket including: a magnet mounting part installed between the cover pad and the first moving bracket and having one end connected to the cover pad and the other end for mounting the magnet; and a plurality of secondary springs each having one end set to a fixed end and the other end set to a free end.

The first moving bracket may further include a first bracket body coupled to the base frame, wherein the primary spring is installed on the first bracket body so as to be disposed toward the cover pad, the one end of the primary spring is a fixed end integrated with the first bracket body, and the other end of the primary spring is a free end deformed with a degree of freedom in the direction of the external force applied to the cover pad.

The plurality of primary springs may be provided as a pair of springs which are disposed to face each other with the magnet mounting part interposed therebetween, and pressurized in the direction of the external force by the magnet mounting part when the cover pad is moved in the direction of the external force.

The second moving bracket may further include a second bracket body coupled to the first moving bracket, wherein the secondary spring is installed on the second bracket body so as to be disposed toward the cover pad, the one end of the secondary spring is a fixed end integrated with the second bracket body, and the other end of the secondary spring is a free end deformed with a degree of freedom in the direction of the external force applied to the cover pad.

The plurality of second springs may be provided as a pair of secondary springs whose free ends are disposed symmetrically with each other in the opposite direction and connected to the magnet mounting part, and pressurized in the direction of the external force by the magnet mounting part when the cover pad is moved in the direction of the external force.

The secondary spring may have a larger spring force than the primary spring.

A distance between the secondary spring and the magnet mounting part may be larger than a distance between the primary spring and the magnet mounting part.

The second moving bracket may further include a spring rib which is formed in a longitudinal direction of the secondary spring and protrudes toward the cover pad.

In an embodiment, a cart may include: a main body including a driver configured to generate electric power and a controller configured to control the driver; a plurality of wheels coupled to the bottom of the main body and configured to move the main body; a handle bar which is installed on one side of the main body, and to which an external force applied in a movement direction of the main body is inputted; and a force sensing module including: a frame supporter installed on the handle bar and moved in the direction of the external force inputted to the handle bar; and a force sensor unit installed adjacent to the frame supporter and configured to sense the movement direction of the frame supporter and divide the magnitude of the external force applied to the frame supporter into a plurality of stages to sense the external force, wherein the controller transfers the power generated by the driver to the wheels according to the movement direction of the frame supporter, sensed by the force sensor unit.

The force sensor unit may include: a magnet coupled to one side of the frame supporter, and moved in a direction corresponding to the direction of the external force by the frame supporter; a Hall sensor installed adjacent to the magnet, and configured to sense the position of the magnet; and a sensor PCB having the Hall sensor mounted thereon, and configured to determine the direction of the external force based on the sensing result of the Hall sensor.

The frame supporter may include: a base frame installed on the handle bar; a pair of cover pads installed over the base frame, and at least partially exposed to the front and rear of the handle bar; a first moving bracket installed between the base frame and the cover pad, and including a plurality of primary springs each having one end set to a fixed end and the other end set to a free end; and a second moving bracket including: a magnet mounting part installed between the cover pad and the first moving bracket and having one end connected to the cover pad and the other end for mounting the magnet; and a plurality of secondary springs each having one end set to a fixed end and the other end set to a free end.

The first moving bracket may further include a first bracket body coupled to the base frame, wherein the primary spring is installed on the first bracket body so as to be disposed toward the cover pad, the one end of the primary spring is a fixed end integrated with the first bracket body, and the other end of the primary spring is a free end deformed with a degree of freedom in the direction of the external force applied to the cover pad.

The plurality of primary springs may be provided as a pair of springs which are disposed to face each other with the magnet mounting part interposed therebetween, and pressurized in the direction of the external force by the magnet mounting part when the cover pad is moved in the direction of the external force.

The second moving bracket may further include a second bracket body coupled to the first moving bracket, wherein the secondary spring is installed on the second bracket body so as to be disposed toward the cover pad, the one end of the secondary spring is a fixed end integrated with the second bracket body, and the other end of the secondary spring is a free end deformed with a degree of freedom in the direction of the external force applied to the cover pad.

The plurality of second springs may be provided as a pair of secondary springs whose free ends are disposed symmetrically with each other in the opposite direction and connected to the magnet mounting part, and pressurized in the direction of the external force by the magnet mounting part when the cover pad is moved in the direction of the external force.

The secondary spring may have a larger spring force than the primary spring.

A distance between the secondary spring and the magnet mounting part may be larger than a distance between the primary spring and the magnet mounting part.

The second moving bracket may further include a spring rib which is formed in a longitudinal direction of the secondary spring and protrudes toward the cover pad.

Advantageous Effects

In accordance with the embodiments of the present disclosure, the handle assembly and the cart can sense the direction that a user's force is applied, and provide an assist force (power assist function) in the corresponding direction, such that the user can easily move the cart. Thus, the user's convenience can be improved.

Furthermore, the force sensing module may be configured to have a degree of freedom in movement only in the direction that a user's force is applied. Thus, control can be performed without considering noise I the vertical direction. Therefore, since sensing can be constantly and accurately performed at all times and a complex control algorithm does not need to be provided, the control efficiency can be improved, and the manufacturing cost can be reduced.

Furthermore, bidirectional forces applied to the handle bar can be sensed through one force sensing module. Therefore, since a complex sensor structure for sensing forces in various directions does not need to be provided, the structure of the force sensing module can be simplified, and the manufacturing cost can be reduced.

Furthermore, the primary spring and the secondary spring within the force sensing module may be designed to have different spring forces, such that the threshold value of the force which can be sensed by the force sensing module can be set in a plurality of steps. For example, the spring force when the cart is started and the spring force when the cart is operated may be differently designed to provide the power assist function with different forces.

Specific effects of the present disclosure with the above-described effects will be described while details for embodying the present disclosure are described.

BRIEF DESCRIPTION OF DRAWINGS

FIG. 1 is a perspective view illustrating a cart in accordance with an embodiment of the present disclosure.

FIG. 2 is a perspective view illustrating a handle assembly of FIG. 1.

FIG. 3 is a perspective view illustrating a force sensing module in the handle assembly in accordance with the embodiment of the present disclosure.

FIG. 4 is a perspective view illustrating a portion of the force sensing module of FIG. 3.

FIG. 5 is an exploded perspective view illustrating the force sensing module of FIG. 3.

FIG. 6 is a graph illustrating a spring force of the force sensing module of FIG. 3.

FIG. 7 is a plan view of the force sensing module of FIG. 3.

FIG. 8 is a side view of the force sensing module of FIG. 7.

FIG. 9 is a plan view of the force sensing module of FIG. 4.

FIGS. 10 and 11 are plan views illustrating an operation state when the force sensing module of FIG. 9 is primarily pressurized.

FIGS. 12 and 13 are plan views illustrating an operation state when the force sensing module of FIG. 9 is secondarily pressurized.

MODE FOR INVENTION

The above-described purposes, features and advantages will be described in detail with reference to the accompanying drawings. Thus, the technical idea of the present disclosure can be easily carried out by those skilled in the art to which the present disclosure pertains. Moreover, detailed descriptions related to publicly known functions or configurations will be ruled out in order not to unnecessarily obscure subject matters of the present disclosure. Hereafter, various embodiments will be described in detail with reference to the accompanying drawings. The same reference numerals in the drawings are used to represent like or similar components.

Hereafter, when an arbitrary component is disposed "at the top (or bottom)" of a component or "over (or under)" the component, it may not only indicate that the arbitrary component is disposed in contact with the top surface (or bottom surface) of the component, but also indicate that another component can be interposed between the component and the arbitrary component disposed over or under the component.

Furthermore, when a certain component is referred to as being "connected to" or "coupled to" another component, it may not only indicate that the components may be directly connected to or coupled to each other, but also indicate that another component is "interposed" between the respective components or the components may be "connected" or "coupled" to each other through another component.

Hereafter, "cart" indicates a device that is manually moved under control of a user or moved by electrical power. The cart may or may not include a function of containing objects. The cart may be used for shopping spaces such as large retail stores, department stores or small-to-medium stores, leisure spaces such as golf courses, and moving spaces such as airports or harbors.

FIG. 1 is a perspective view illustrating a cart in accordance with an embodiment of the present disclosure. FIG. 2 is a perspective view illustrating a handle assembly of FIG. 1. FIG. 3 is a perspective view illustrating a force sensing module in the handle assembly in accordance with the embodiment of the present disclosure. FIG. 4 is a perspective view illustrating a portion of the force sensing module of FIG. 3. FIG. 5 is an exploded perspective view illustrating the force sensing module of FIG. 3. FIG. 6 is a graph illustrating a spring force of the force sensing module of FIG. 3. FIG. 7 is a plan view of the force sensing module of FIG. 3. FIG. 8 is a side view of the force sensing module of FIG. 7. FIG. 9 is a plan view of the force sensing module of FIG. 4. FIGS. 10 and 11 are plan views illustrating an operation state when the force sensing module of FIG. 9 is primarily pressurized. FIGS. 12 and 13 are plan views illustrating an operation state when the force sensing module of FIG. 9 is secondarily pressurized.

As illustrated in FIG. 1, the cart 10 in accordance with the embodiment of the present disclosure includes a main body 100 having a driver 110 and a controller 130 mounted therein, a storage part 200 installed on one side of the main body 100, a plurality of wheels 300 coupled to the bottom of the main body 100, and a handle assembly 400 coupled to one side of the main body 100 or the storage part 200. The handle assembly 400 includes a handle bar 4100 held by a user and a force sensing module 4300 for sensing the direction of a force desired by the user.

The main body 100 may have a substantially hexahedral shape, and include various components mounted therein. The main body 100 may include the driver 110 and the controller 130 mounted therein. The driver 110 may provide electric power to the wheels 300, and the controller 130 may have full control over the cart 10. Although not illustrated in the drawings, various sensors or control devices required for operation of the cart 10 may be mounted in the main body 100.

The driver 110 may include a battery, a motor and the like. The driver 110 may provide an assist force to at least some of the plurality of wheels 300 under control of the controller 130. When the assist force is provided to the wheels 300, an additional force may be provided in the direction that the user applies a force. Thus, the user can easily move the cart 10. In the present embodiment, the function for providing an assist force required for moving the cart is defined as a 'power assist' function.

The controller 130 may determine the direction of a force applied by the user through the force sensing module 4300 installed in the handle assembly 400, and control the cart 10 to move in the corresponding direction. The control range of the controller 130 may include whether to operate the driver 110, the transfer direction of the assist force generated by the driver 110, and the rotation direction of the wheels 300 depending on the transfer direction of the assist force.

For example, when it is sensed that the user intends to move forward, the controller 130 may operate the driver 110 to generate power, and then control the transfer direction of the driving power to rotate the wheels 300 forward. On the other hand, when it is sensed that the user intends to move backward, the controller 130 may operate the driver 110 to generate power, and then control the transfer direction of the driving power to rotate the wheels 300 backward.

For this operation, the controller 130 controls the force sensing module 4300 and the driver 110 while communicating with the force sensing module 4300 and the driver 110. Furthermore, the controller 130 may directly control the rotation direction of the wheels 300, or connect the driver 110 and the wheels 300 and then control the rotation direction of the wheels 300 by controlling the power transfer direction of the driver 110.

The storage part 200 may be installed on the top surface of the main body 100. However, depending on the use of the cart or the place of use of the cart, the storage part 200 may be disposed on a side surface, the front surface or the rear surface of the main body 100.

The plurality of wheels 300 are rotatably coupled to the bottom of the main body 100. In the present embodiment, the wheels 300 are composed of two front wheels and two rear wheels. The rear wheels 300 may be manually rotated when the user pushes the cart 10, or semi-automatically or automatically rotated by electrical power received from the driver 110. The rear wheels 300 may have a larger size than the front wheels 300.

The handle assembly 400 is installed on the rear side of the main body 100 and the storage part 200. The handle assembly 400 may be coupled to the storage part 200 or coupled to the main body 100. The handle assembly 400 may include the handle bar 4100 held by a user and the force sensing module 4300 installed on the handle bar 4100. The handle bar 4100 is coupled to the storage part 200 or the main body 100 through a separate frame structure.

As illustrated in FIG. 2, the handle bar 4100 is a straight bar, and includes a plurality of frames to form the exterior thereof. The handle bar 4100 may have a mounting space formed by the frames. The force sensing module 4300 may be mounted in the mounting space formed in such a manner, and some components of the force sensing module 4300 may be exposed to the outside of the handle bar 4100.

In FIG. 2, P1 represents the direction of a force which the user applies to the cart 10 to move forward, and P2 represents the direction of a force which the user applies to the cart 10 to move backward. The user pushes the cart 10 in the direction P1 when intending to move forward, and pulls the cart 10 in the direction P2 when intending to move backward. The direction of the force may be sensed through the force sensing module 4300, transferred to the controller 130, and utilized to provide the power assist function.

As illustrated in FIGS. 2 to 5, the force sensing module 4300 includes a frame supporter 4310 and a force sensor unit 4330.

As illustrated in FIGS. 3 to 5, the frame supporter 4310 includes a pair of cover pads 4311 pressurized by a user, a base frame 4312 mounted on the handle bar 4100, an upper frame 4313 coupled between the cover pads 4311, and first and second moving brackets 4314 and 4315 moved by the cover pads 4311. Hereafter, the longitudinal directions and widthwise directions of the respective components are defined based on the longitudinal direction of the handle bar. The longitudinal direction is parallel to the longitudinal direction of the handle bar, and the widthwise direction is perpendicular to the longitudinal direction of the handle bar.

As illustrated in FIGS. 3 and 5, the pair of cover pads 4311 have the same structure as each other, and are disposed to face each other. Each of the cover pads 4311 includes a cover plate 4311a formed in a substantially rectangular plate shape, a guide plate 4311b formed at the top of the cover plate 4311a, and a plurality of fastening holes 4311c formed through the guide plate 4311b.

The cover plate 4311a has an outer surface exposed to the outside of the handle bar 4100 and an inner surface facing the inside of the handle bar 4100. The outer surface may be disposed on the same plane as one surface of the handle bar 4100, through which the cover plate 4311a is exposed. The outer surface may be formed to have the same curvature as the handle bar 4100, when the handle bar 4100 is formed with a curved surface. For convenience of description, between the pair of cover pads 4311, the cover pad 4311 disposed on the side facing the storage part 200 is defined as the inner cover pad 4311, and the cover pad 4311 disposed on the opposite side thereof is defined as the outer cover pad 4311.

The cover pads 4311 are pushed and moved into the handle bar 4100 by pressurization of a user. Since the pair of cover pads 4311 are disposed to face each other, the cover pads 4311 may sense forces in both directions P1 and P2. This configuration will be described below. The guide plate 4311b and the plurality of fastening holes 4311c which are required for coupling the upper frame 4313 are formed on the inner surface of the cover plate 4311a.

The guide plate 4311b protrudes from the top of the cover plate 4311a in the longitudinal direction of the cover pad 4311. The guide plate 4311b is formed in a plate shape with a predetermined width. The plurality of fastening holes 4311c are formed through the guide plate 4311b. With the upper frame 4313 seated on the top surface of the guide plate 4311b, fastening members such as bolts are inserted into the fastening holes 4311c to couple the upper frame 4313 to the guide plate 4311b.

Since the pair of cover pads 4311 are disposed to face each other, the guide plates 4311b support the upper frame 4313 from both sides in the longitudinal direction, respectively. The base frame 4312 is disposed under the cover pads 4311, and the upper frame 4313 is disposed at the top of the cover pads 4311.

As illustrated in FIG. 5, the base frame 4312 is mounted in the handle bar 4100 and supports the first moving bracket 4314 which will be described below. The base frame 4312 is formed in a plate shape having a larger length than the cover pad 4311, and has an edge portion formed along either side thereof in the longitudinal direction and extended upward. The upward extended edge portion serves as a guide rib 4312b that blocks separation of the first moving bracket 4314. The base frame 4312 has a plurality of fastening holes 4312c formed at a plate surface thereof, and is coupled to the handle bar 4100 by fastening members such as bolts.

As illustrated in FIG. 5, the upper frame 4313 is disposed to face the base frame 4312, and coupled to the top surface of the guide plate 4311b formed on the cover pad 4311. The upper frame 4313 serves to connect the pair of cover pads 4311. For this structure, the upper frame 4313 has a plurality of fastening holes 4313b formed at the plate surface thereof, and is coupled to the guide plate 4311b by the fastening members such as bolts. The upper frame 4313 may have a through-hole 4313a formed at a position corresponding to a magnet which will be described below. However, since the through-hole 4313a is only a structure for conveniently inserting the magnet, the through-hole 4313a may be omitted.

The first moving bracket 4314 and the second moving bracket 4315 are mounted on the bottom surface of the upper frame 4313. The plurality of fastening holes 4313b may also be formed at portions coupled to the first and second moving brackets 4314 and 4315.

As illustrated in FIGS. 4 and 5, the first moving bracket 4314 includes a plate-shaped first bracket body 4314a having a smaller size than the base frame 4312 and a pair of primary springs 4314b integrated with the first bracket body 4314a and deformed with a degree of freedom only in one direction. The first bracket body 4314a has a bracket seating part 4314c formed thereon, such that the second moving bracket 4315 is seated on the bracket seating part 4314c. The first bracket body 4314a includes a plurality of bracket coupling protrusions 4314e to be coupled to a second bracket body 4315a, a plurality of PCB coupling bosses 4314d and PCB coupling protrusions 4314f to be coupled to a sensor PCB 4331, and a plurality of fastening holes 4314g into which fastening members such as bolts are inserted.

The above-described components are all formed on the top surface of the first bracket body 4314a.

The first bracket body 4314a has a substantially rectangular plate shape. The primary springs 4314b, the bracket seating part 4314c, the bracket coupling protrusions 4314e, the PCB coupling bosses 4314d and the PCB coupling protrusions 4314f are formed on the top surface of the first bracket body 4314a. The plurality of fastening holes 4314g are formed through a plurality of positions of the first bracket body 4314a. The primary springs 4314b are formed in the longitudinal direction corresponding to the long-side direction of the first bracket body 4314a.

The primary springs 4314b are formed on the top surface of the first bracket body 4314a so as to protrude in the longitudinal direction. Furthermore, the pair of primary springs 4314b are disposed in the longitudinal direction of the first bracket body 4314a so as to face each other.

One end of the primary spring 4314b is a fixed end integrated with the first bracket body 4314a. The other end of the primary spring 4314b is a free end which can move with a degree of freedom without a fixed portion. As illustrated in FIG. 4, the other end of the primary spring 4314*b*, i.e. the free end, may be bent in a U-shape. The bent end may be located between the fixed end and the free end. That is, the primary spring 4314*b* may not be formed in a U-shape as a whole, but formed in a U-shape whose one side is shorter than the other side. As long as the one end of the primary spring 4314*b* may be a fixed end and the other end thereof may be a free end, the shape of the primary spring 4314*b* can be deformed into another shape. When an external force is transferred to the primary spring 4314*b*, the free end is deformed while the force is applied only to the free end around the fixed end integrated with the first bracket body 4314*a*.

With the first and second moving brackets 4314 and 4315 coupled onto the base frame 4312, the primary spring 4314*b* is disposed to protrude further toward the cover plate 4311*a* of the cover pad 4311 than a secondary spring 4315*b* which will be described below. Therefore, when an external force is transferred by the cover pad 4311, the primary spring 4314*b* is pressurized and deformed before the secondary spring 4315*b*. The primary spring 4314*b* is deformed to pressurize and move the second moving bracket 4315, and thus a magnet 4333 is moved. Since a sensed value of a Hall sensor 4332 is changed according to the movement of the magnet 4333, the direction and magnitude of the force applied to the cover pad 4311 can be sensed.

The pair of bracket seating parts 4314*c* protruding from the first bracket body 4314*a* are disposed between the pair of primary springs 4314*b* so as to face each other. The bracket seating part 4314*c* has a support installed on one side of a rib protruding in a T-shape and brought in surface contact with the second moving bracket 4315. The bracket seating part 4314*c* serves to support the first moving bracket 4314 in order to secure a proper distance between the magnet 4333 and the Hall sensor 4332. The shape of the bracket seating part 4314*c* is only an example, and not limited to the above-described shape, as long as the bracket seating part 4314*c* can be brought in surface contact with a magnet mounting part 4315*c* of the second moving bracket 4315, which will be described below, and movably support the magnet mounting part 4315*c*.

The first bracket body 4314*a* may have the bracket coupling protrusion 4314*e* formed in the center of either end thereof in the longitudinal direction. The bracket coupling protrusion 4314*e* is inserted through the second bracket body 4315*a* to seat the second moving bracket 4315 on the first moving bracket 4314. In this state, fastening members such as bolts or screws are sequentially passed through the fastening holes 4315*e* of the second moving bracket 4315, and the fastening holes 4314*g* and 4312*c* of the first moving bracket 4314 and the base frame 4312, respectively, and coupled to the fastening holes 4315*e*, 4314*g* and 4312*c*, such that the first moving bracket 4314 and the second moving bracket 4315 are coupled to the base frame 4312.

The plurality of PCB coupling bosses 4314*d*, to which the fastening members such as bolts or screws are coupled, may be formed on the first bracket body 4314*a*. The PCB coupling bosses 4314*d* are coupled to the fastening members after the sensor PCB 4331 to be described below is seated. The PCB coupling bosses 4314*d* may be inserted through the sensor PCB 4331, or contacted with and coupled to the bottom surface of the sensor PCB 4331. Such a coupling structure for maintaining the space between the Hall sensor 4332 and the magnet 4333 may be decided according to a pre-designed distance.

The plurality of PCB coupling protrusions 4314*f* may be formed on the top surface of the first bracket body 4314*a*. The PCB coupling protrusions 4314*f* are formed to correspond to the position of the sensor PCB 4331. The PCB coupling protrusions 4314*f* are inserted through the plate surface of the sensor PCB 4331 so as to seat the sensor PCB 4331 thereon. With the sensor PCB 4331 seated on the PCB coupling protrusions 4314*f*, the second moving bracket 4315 is coupled to the first moving bracket 4314 and the base frame 4312.

As described above, the plurality of fastening holes 4314*g* are holes into which the fastening members for fixing the first and second moving brackets 4314 and 4315 to the base frame 4312 are inserted. The plurality of fastening holes 4314*g* are formed through the first bracket body 4314*a*. The fastening holes 4314*g* may be formed at positions where the fastening members do not interfere with other portions when passed through the first moving bracket 4314, the second moving bracket 4315 and the base frame 4312.

The second moving bracket 4315 and the force sensor unit 4330 are coupled to the top of the first moving bracket 4314 having the above-described structure.

As illustrated in FIGS. 4 and 5, the second moving bracket 4315 includes the second bracket body 4315*a* formed in a substantially rectangular shape corresponding to a straight line shape. The pair of secondary springs 4315*b* are formed in the longitudinal direction of the second bracket body 4315*a*. Between the secondary springs 4315*b*, the magnet mounting part 4315*c* integrated with the secondary springs 4315*b* is installed. The magnet mounting part 4315*c* has a plurality of coupling protrusions 4315*d* formed on the top surface thereof so as to be coupled to the upper frame 4313. A plurality of fastening holes 4315*e* are formed through the top surface of the magnet mounting part 4315*c* and both sides of the second bracket body 4315*a*.

The second bracket body 4315*a* is coupled to the top of the first moving bracket 4314, and should not interfere with the first moving bracket 4314 during an operation of the first moving bracket 4314. For this structure, the second bracket body 4315*a* has a rectangular ring shape with the minimum width so as to be coupled to the first bracket body 4314*a*, instead of a plate shape. That is, the second bracket body 4315*a* is formed in a rectangular frame shape with a predetermined width.

The pair of secondary springs 4315*b* are formed in the longitudinal direction of the second bracket body 4315*a* so as to face each other, and the plurality of fastening holes 4315*e* are formed through both sides of the second bracket body 4315*a* in the widthwise direction. The fastening members are coupled to the fastening holes 4315*e* so as to couple the second bracket body 4315*a* to the first bracket body 4314*a* and the base frame 4312.

Each of the pair of secondary springs 4315*b* has one end formed as a fixed end and the other end formed as a free end, like the primary springs 4314*b*. The one end of one secondary spring 4315*b* between the pair of secondary springs 4315*b* is integrated with one end of the second bracket body 4315*a* in the longitudinal direction, and protrudes upward. The other end of the one secondary spring 4315*b* is extended toward the other end of the second bracket body 4315*a*, and partially bent in a U-shape to form a free end. The other secondary spring 4315*b* between the pair of secondary spring 4315*b* has a symmetrical structure with the one secondary spring 4315*b* in the opposite direction. When an external force is applied to the cover pad 4311, only the free end of the secondary spring 4315*b* is deformed in the direction of the external force. The secondary spring 4315*b* is deformed in connection with the movement of the magnet mounting part 4315c, but not contacted with the primary spring 4314b.

The secondary spring 4315b may be designed to have a larger spring force (spring constant) than the primary spring 4314b. For this structure, the secondary spring 4315b may have a spring rib 4315b' formed at a portion facing the cover pad 4311 so as to protrude with a predetermined width in the longitudinal direction. The spring rib 4315b' may be installed to adjust the spring force or bending of the secondary spring 4315b. Furthermore, when an external force is applied to the cover pad 4311, the spring rib 4315b' may bring the secondary spring 4315b in contact with the cover plate 4311a, thereby preventing excessive deformation of the secondary spring 4315b.

Furthermore, the distance between the secondary spring 4315b and the magnet mounting part 4315c moved by the upper frame 4313 may be adjusted to block the deformation of the secondary spring 4315b when the primary spring 4314b is deformed. This process will be described below.

The magnet mounting part 4315c having a substantially rectangular parallelepiped shape is connected to the bent ends of the pair of secondary springs 4315b.

Both sides of the magnet mounting part 4315c may be coupled to or integrated with the free ends of the secondary springs 4315b. The magnet mounting part 4315c may have a substantially rectangular parallelepiped shape. The magnet mounting part 4315c may have a through-hole formed in the center thereof, and the magnet 4333 to be described below may be inserted into the through-hole. The through-hole may communicate with the top surface of the magnet mounting part 4315c, or be formed only at the bottom surface of the magnet mounting part 4315c. The magnet mounting part 4315c has the plurality of coupling protrusions 4315d formed on the top surface thereof so as to be inserted through the fastening holes 4313b of the upper frame 4313. The magnet mounting part 4315c has the plurality of fastening holes 4315e formed on the top surface thereof, and is coupled to the upper frame 4313 by fastening members such as bolts or screws. Both ends of the bottom surface of the magnet mounting part 4315c in the longitudinal direction are disposed in surface contact with the above-described bracket seating parts 4314c of the first moving bracket 4314. The distance between the Hall sensor 4332 and the magnet 4333 mounted in the magnet mounting part 4315c may be constantly maintained by the bracket seating part 4314c.

Since the cart 10 is moved on the moving surface of an indoor place or the ground surface, vibration occurs in the vertical direction as well as the horizontal direction of the cart 10. Such vibration acts as noise that disturbs accurate sensing. The noise serves as a factor that makes control complex. However, since the handle assembly in accordance with the present embodiment has a structure to allow the magnet 4333 to move only in the horizontal direction of the cart 10, the magnet 4333 and the Hall sensor 4332 can maintain the constant distance at all times. Therefore, since a complex control algorithm does not need to be provided while sensing can be stably performed, the control efficiency can be increased, and the manufacturing cost can be reduced.

The magnet mounting part 4315c is coupled to the upper frame 4313 and moves the magnet 4333 while moved along the upper frame 4313 when the cover pad 4311 is moved. The magnet mounting part 4315c is pressurized by the cover pad 4311 and primarily pressurizes the primary spring 4314b of the first moving bracket 4314. Then, when a larger external force is applied to the cover pad 4311, the magnet mounting part 4315c secondarily pressurizes the secondary spring 4315b of the second moving bracket 4315. This process will be described below.

As illustrated in FIGS. 4 and 8, the force sensor unit 4330 includes the sensor PCB 4331, the Hall sensor 4332 mounted on the sensor PCB 4331, and the magnet 4333 mounted on the first moving bracket 4314.

The sensor PCB 4331 supports the Hall sensor 4332, and transfers a sensing result of the Hall sensor 4332 to the controller 130 through communication with the controller 130. The sensor PCB 4331 may include various circuits for sensing. The sensor PCB 4331 may include a through-hole 4331a formed through the plate surface thereof and a plurality of fastening holes 4331b formed therethrough. The through-hole 4331a is a hole through which the bracket seating part 4314c of the first moving bracket 4314 is passed and exposed. The fastening holes 4331b may include holes into which the PCB coupling protrusions 4314f formed on the first moving bracket 4314 are inserted and holes into which fastening members are inserted. The Hall sensor 4332 is mounted on the top surface of the sensor PCB 4331.

Although no reference numeral is applied, a box-shaped structure on the sensor PCB 4331 serves as a reference structure for setting the initial positions at which the magnet 4333 and the Hall sensor 4332 are balanced with each other. The shape of the box-shaped structure may be changed, or the box-shaped structure may be omitted.

The Hall sensor 4332 is mounted on the sensor PCB 4331 at a position corresponding to the position of the magnet 4333. Since the magnet 4333 is coupled to the second moving bracket 4315 and moved in the front-to-rear direction of the cart 10, the Hall sensor 4332 may be disposed at the position before the movement of the magnet 4333 so as to correspond to the center of the magnet 4333.

The Hall sensor 4332 is a sensor that senses a change in magnetic field according to the movement of the magnet 4333. When the magnet 4333 is moved in the direction P1 or P2 (refer to FIG. 2 or 8), the Hall sensor 4332 senses a change in magnetic field, which is caused by the movement. The sensing result of the Hall sensor 4332 may be transferred to the sensor PCB 4331, and the sensor PCB 4331 may determine the direction that the force is applied.

The magnet 4333 is coupled to the magnet mounting part 4315c and spaced a preset distance from the Hall sensor 4332. The magnet 4333 is a permanent magnet with the N pole and the S pole. Although the magnet 4333 is moved by the second moving bracket 4315, the magnet 4333 should not get out of the sensing area of the Hall sensor 4332. Therefore, the size and position of the magnet 4333 are designed in consideration of the sensing area of the Hall sensor 4332.

The magnet 4333 is coupled to the second moving bracket 4315 and moved. The second moving bracket 4315 is pressurized and moved by the secondary spring 4315b as well as the primary spring 4314b.

When the secondary spring 4315b is configured to have a larger spring force than the primary spring 4314b, a force applied to the cover pad 4311 may be divided into two stages and sensed.

As illustrated in FIG. 6, when a user pressurizes the cover pad 4311 with a first force in the direction P1 or P2, only the primary spring 4314b may be deformed. However, when the user pressurizes the cover pad 4311 with a second force larger than the first force, the secondary spring 4315b may also be deformed with the primary spring 4314b. This is because there is a difference in spring force between the primary spring 4314b and the secondary spring 4315b. Furthermore, that is because a distance 'L2' between the secondary spring 4315b and the magnet mounting part 4315c is larger than a distance 'L1' between the primary spring 4314b and the magnet mounting part 4315c as illustrated in FIG. 9.

Since the first moving bracket 4314 and the second moving bracket 415 are coupled to each other and the magnet mounting part 4315c is coupled to the upper frame 4313, the magnet mounting part 4315c is moved in the direction that the cover pad 4311 is moved.

As illustrated in FIGS. 10 and 11, when an external force in the direction P1 or P2 is applied to the cover pad 4311, the magnet mounting part 4315c is contacted with the primary spring 4314b before the secondary spring 4315b, because the distance L1 between the primary spring 4314b and the magnet mounting part 4315c is smaller than the distance L2 between the secondary spring 4315b and the magnet mounting part 4315c. Thus, when the first force is applied as described above, only the primary spring 4314b is deformed. Since the magnet mounting part 4315c is moved by the deformation of the primary spring 4314b while the primary spring 4314b is deformed, the position of the magnet 4333 is changed, and the sensed value of the Hall sensor 4332 is changed. Therefore, the sensor PCB 4331 may determine the magnitude and direction of the first force.

Similarly, when the second force having a larger magnitude than the first force is applied to the cover pad 4311, the magnet mounting part 4315c pressurizes the secondary spring 4315b as well as the primary spring 4314b as illustrated in FIGS. 12 and 13. Thus, since the magnet mounting part 4315c is moved by the deformation of the secondary spring 4315b while the secondary spring 4315b is deformed, the position of the magnet 4333 is changed again, and the sensed value of the Hall sensor 4332 is changed. Therefore, the sensor PCB 4331 may determine the magnitude and direction of the second force.

In the above embodiment, it has been described that the upper frame 4313 and the second moving bracket 4315 are separately provided. However, the upper frame 4313 and the second moving bracket 4315 may be formed as one body.

Hereafter, the force sensing process and the power assist process which are performed in the cart having the above-described structure in accordance with the embodiment of the present disclosure will be described.

As illustrated in FIGS. 7 to 9, the magnet 4333 is located in the center between the secondary springs 4315b because the upper frame 4313 and the second moving bracket 4315 are not moved before the cart 10 is moved. The Hall sensor 4332 is positioned under the magnet 4333. In this state, none of the primary spring 4314b and the secondary spring 4315b is deformed.

Referring to FIGS. 1 to 3, a user may push the handle bar 4100 to move the cart 10 forward. At this time, the user pressurizes the outer cover pad 4311 in the direction P1.

As illustrated in FIG. 11, when the first force in the direction P1 is applied to the cover pad 4311, the upper frame 4313 is moved in the direction P1. Since the second moving bracket 4315 is coupled to the upper frame 4313, the second moving bracket 4315 is also moved in the direction P1. Therefore, as the magnet 4333 mounted in the magnet mounting part 4315c is also moved in the direction P1, the relative position between the Hall sensor 4332 and the adjacent pole of the magnet 4333 is changed. Thus, the Hall sensor 4332 may sense a change in magnetic field, which occurs before and after the magnet 4333 is moved, and the sensor PCB 4331 may process the sensed change in magnetic field and determine that the force was applied in the direction P1. In the present disclosure, the process of sensing the direction that the force is applied is defined as 'force sensing'.

When the sensor PCB 4331 transfers the sensing result to the controller 130, the controller 130 may determine that 'power assist' is required to supply an assist force in the direction P1. The controller 130 may control the driver 110 to generate electric power, and transfer the electric power to the wheels 300. The wheels 300 are driven by the assist force received through the controller 130.

For example, when it is assumed that the user pushes the cart 10 with a force of 10, a force of 90 to push the cart 10 may be additionally provided through the power assist function. Thus, the cart 10 is moved at the same force and speed as the cart 10 is pushed by a force of 100, but the force actually applied by the user is 10. Therefore, since the user can move the cart 10 with a small force, the user's convenience is improved.

When the second force larger than the first force in the direction P1 is applied to the cover pad 4311 as illustrated in FIG. 13, the relative position between the Hall sensor 4322 and the adjacent pole of the magnet 4333 is changed again. Thus, the Hall sensor 4332 may sense a change in magnetic field, which occurs due to the secondary movement of the magnet 4333, and the sensor PCB 4331 may process the sensed change in magnetic field and determine that the second force was applied in the direction P1.

When the second force larger than the first force is applied, the controller 130 may determine that a power assist function with a larger force and higher speed is required. Therefore, the controller 130 may provide an assist force at a larger force and higher speed than when the first force is applied. For example, when the speed is divided into first and second stages and it is determined that the first force was applied, the controller 130 may control the cart 10 to operate at the speed of the first stage. When it is determined that the second force was applied, the controller 130 may control the cart 10 to operate at the speed of the second stage.

The reason why the forces are sorted into the first and second forces and the speed is divided into the first and second stages is in order to improve the convenience of a user who uses the cart 10.

When the user operates the cart 10 without the help of the power assist function, the cart 10 is operated only at a speed corresponding to the magnitude of a force of the user who pushes or pulls the cart 10. However, when the power assist function is driven, the cart 10 can be operated at a higher speed than a speed corresponding to a force applied by the user, even though the user applies a small force.

Therefore, when the power assist function is driven, the power assist function needs to be provided at low speed at the time of start to help the user to adjust to the speed, in order to prevent a safety accident while enabling the user to adjust to high speed at the initial stage.

Then, when the user applies an additional force after sufficiently adjusting to the power assist function, the controller 130 may determine that the user wants higher speed, and provide the additional power assist function by increasing the speed of the cart 10.

For example, the controller 130 may divide the threshold value of the force for the power assist function into two stages in response to the primary spring and the secondary spring which have different spring forces. The two stages may include 'initial start mode' and 'operation mode'.

When the user applies a force equal to or less than a first threshold value (for example, the first force), the controller 130 may determine that the current mode is the initial start mode. When it is assumed that the assist force provided through the power assist function is 100 and the force applied by the user is 10, the controller 130 may provide an assist force of 40 in the initial start mode such that the cart 10 can be driven by a total force of 50. Therefore, although the power assist function is driven in the initial start mode, the cart 10 is not suddenly started at high speed, but driven by the force of 50. Thus, the user may adjust to the speed of the cart 10 which is automatically accelerated.

When the user applies a force equal to or more than the first threshold value and equal to or less than a second threshold value (for example, the second force), the controller 130 may determine that the current mode is the operation mode. In this case, when it is assumed that the user applies a force of 20, the controller 130 may provide an assist force of 80, such that the cart 10 can be driven by a total force of 100.

The above-described threshold values, the magnitude of the force applied by the user, the magnitude of the assist force are the like are only examples, and may be changed to various values, if necessary.

On the contrary to the above-described case, the user may pull the handle bar 4100 to move the cart 10 backward as illustrated in FIGS. 1 to 3. At this time, the user pressurizes the inner cover pad 4311 in the direction P2.

As illustrated in FIG. 10, when the first force in the direction P2 is applied to the cover pad 4311, the upper frame 4313 is moved in the direction P2. Since the second moving bracket 4315 is coupled to the upper frame 4313, the second moving bracket 4315 is also moved in the direction P2. Therefore, while the magnet 4333 mounted in the magnet mounting part 4315c is also moved in the direction P2, the relative position between the Hall sensor 4332 and the adjacent pole of the magnet 4333 is changed. Thus, the Hall sensor 4332 may sense a change in magnetic field, which occurs before and after the magnet 4333 is moved, and the sensor PCB 4331 may process the sensed change in magnetic field and determine that the force was applied in the direction P2.

When the sensor PCB 4331 transfers the sensing result to the controller 130, the controller 130 may determine that 'power assist' is required to supply an assist force in the direction P2. The controller 130 may control the driver 110 to generate electric power, and transfer the electric power to the wheels 300. The wheels 300 are driven by the assist force received through the controller 130.

When the second force larger than the first force in the direction P2 is applied to the cover pad 4311 as illustrated in FIG. 12, the relative position between the Hall sensor 4332 and the adjacent pole of the magnet 4333 is changed again. Thus, the Hall sensor 4332 may sense a change in magnetic field, which occurs due to the secondary movement of the magnet 4333, and the sensor PCB 4331 may process the sensed change in magnetic field and determine that the second force was applied in the direction P2.

When the second force larger than the first force is applied, the controller 130 may determine that a power assist function with a larger force and higher speed is required. Therefore, the controller 130 may provide an assist force at a larger force and higher speed than when the first force is applied. For example, when the speed is divided into the first and second stages and it is determined that the first force was applied, the controller 130 may control the cart 10 to operate at the speed of the first stage. When it is determined that the second force was applied, the controller 130 may control the cart 10 to operate at the speed of the second stage.

Although excessive pressure is applied to the cover pad 4311 during the above-described process, the movement of the magnet mounting part 4315c is restrained by the spring rib 4315b' formed on the secondary spring 4315b. Therefore, the magnet 4333 may be moved within the sensing area of the Hall sensor 4332, and the Hall sensor 4332 may perform stable sensing.

The above-described force sensing module 4300 has a structure in which the cover pad 4311, the upper frame 4313, the first moving bracket 4314 and the second moving bracket 4315 are coupled to one another and operated in connection with one another, and the magnet mounting part 4315c is moved with a degree of freedom only in the direction P1 or P2 that the force is applied. Therefore, since the distance between the Hall sensor 4332 and the magnet 4333 can be maintained as the preset distance, sensing can be accurately performed.

In the above-described embodiment, when a force is applied in the direction P1 or P2, the Hall sensor 4332 senses the force such that the controller 130 provides the power assist function. In this case, the cart may be referred to as operating in the power assist mode. When no force is applied in the direction P1 or P2, the controller 130 may determine that the user operates the cart 10 in a manual mode.

Although not illustrated in the drawings, a switch for transferring a power assist mode on/off signal to the controller 130 instead of the Hall sensor 4332 and the magnet 4333 may be installed on the handle bar 4100. In this case, the user may operate the switch to directly execute the power assist mode.

In the above-described embodiment, it has been described that two kinds of springs, i.e. the primary spring and the secondary spring are provided to divide the magnitude of a force into two stages and to sense the magnitude of the force, and the speed is adjusted in two stages. However, the number of springs may be adjusted and the springs may be designed to have different spring forces, such that the magnitude of the force can be divided into two or more stages and the speed can be adjusted in a plurality of stages.

Although the present disclosure has been described with reference to the drawings, the present disclosure is not limited to the embodiments and drawings disclosed in this specification, but it is obvious that various modifications can be made by a person skilled in the art within the scope of the present disclosure. Although an operation effect by a component of the present disclosure is not explicitly described while the embodiments of the present disclosure are described, it is obvious that an expectable effect by the corresponding component needs to be recognized.

INDUSTRIAL APPLICABILITY

The cart in accordance with the embodiment of the present disclosure may be used for various fields such as the commercial field, the leisure field and the distribution field.

The invention claimed is:

1. A handle assembly for a cart, the handle assembly comprising:
   a handle bar locatable at one side of a cart to receive an external force applied in a movement direction of the cart; and
   a force sensing assembly including:
      a frame support provided on the handle bar and movable in a direction of the external force applied to the handle bar; and
      a force sensor located adjacent to the frame support to sense the direction of movement of the frame support and categorize the magnitude of the external force applied to the frame support into a plurality of stages to sense the external force, wherein the frame support includes:
- a base frame provided on the handle bar;
- a pair of cover pads attached to the base frame;
- a first moving bracket located between the base frame and the cover pads, the first moving bracket including a pair of primary springs, each primary spring having a first end that is fixed and a second end configured to move in response to movement of the frame support; and
- a second moving bracket including:
  - a magnet mounting part located between the cover pads and the first moving bracket, the magnet mounting part having a first end connected to the cover pads and a second end to mount a magnet; and
  - a pair of secondary springs, each secondary spring having a first end that is fixed and a second end configured to move in response to movement of the frame support.

2. The handle assembly of claim 1, wherein the force sensor includes:
- the magnet coupled to a side of the frame support, the magnet being movable in a direction corresponding to the direction of the external force;
- a sensor printed circuit board (PCB); and
- a Hall sensor located adjacent to the magnet to sense a position of the magnet, and
- wherein the sensor PCB is configured to determine the direction of movement of the frame support based on the position of the magnet sensed by the Hall sensor.

3. The handle assembly of claim 2, wherein the first moving bracket further includes a first bracket body coupled to the base frame, and
wherein the primary springs are provided on the first bracket body, each primary spring being disposed toward a respective one of the cover pads, the first end of each primary spring being fixed to and integrated with the first bracket body, and the second end of each primary spring being deformable with a degree of freedom in the direction of the external force applied to the respective cover pad.

4. The handle assembly of claim 3, wherein the primary springs face each other with the magnet mounting part interposed therebetween, and are pressurized in the direction of the external force by the magnet mounting part when at least one of the cover pads is moved in the direction of the external force.

5. The handle assembly of claim 4, wherein the second moving bracket further includes a second bracket body coupled to the first moving bracket, and
wherein the secondary springs are provided on the second bracket body, each secondary spring being disposed toward a respective one of the cover pads, the first end of each secondary spring being fixed to the second bracket body, and the second end of each secondary spring being deformable with a degree of freedom in the direction of the external force applied to the respective cover pad.

6. The handle assembly of claim 5, wherein the second end of the secondary springs are provided in opposing directions and are connected to the magnet mounting part, and the secondary springs are pressurized in the direction of the external force by the magnet mounting part when at least one of the cover pads is moved in the direction of the external force.

7. The handle assembly of claim 6, wherein each secondary spring has a larger spring force than each primary spring.

8. The handle assembly of claim 7, wherein a distance between each secondary spring and the magnet mounting part is larger than a distance between each primary spring and the magnet mounting part.

9. The handle assembly of claim 8, wherein the second moving bracket further includes a spring rib formed in a longitudinal direction of each secondary spring and protruded toward the cover pad.

10. A cart comprising:
- a main body including:
  - a driver to generate electric power; and
  - a controller configured to control the driver;
- a wheel coupled to a lower portion of the main body to move the main body;
- a handle bar provided at one side of the main body to receive an external force applied in a movement direction of the main body; and
- a force sensing assembly including:
  - a frame support provided on the handle bar and movable in a direction of the external force applied to the handle bar; and
  - a force sensor located adjacent to the frame support to sense the direction of movement of the frame support and categorize the magnitude of the external force applied to the frame support into a plurality of stages to sense the external force, wherein the controller is configured to transfer the electric power generated by the driver to the wheel according to the direction of movement of the frame support sensed by the force sensor, and wherein the frame support includes:
- a base frame provided on the handle bar;
- a pair of cover pads attached to the base frame;
- a first moving bracket located between the base frame and the cover pads, the first moving bracket including a pair of primary springs, each primary spring having a first end that is fixed and a second end configured to move in response to movement of the frame support; and
- a second moving bracket including:
  - a magnet mounting part located between the cover pads and the first moving bracket, the magnet mounting part having a first end connected to the cover pads and a second end to mount a magnet; and
  - a pair of secondary springs, each secondary spring having a first end that is fixed and a second end configured to move in response to movement of the frame support.

11. The cart of claim 10, wherein the force sensor includes:
- the magnet coupled to a side of the frame support, the magnet being movable in a direction corresponding to the direction of the external force;
- a sensor printed circuit board (PCB); and
- a Hall sensor located adjacent to the magnet to sense a position of the magnet, and
- wherein the sensor PCB is configured to determine the direction of movement of the frame support based on the position of the magnet sensed by the Hall sensor.

12. The cart of claim 11, wherein the first moving bracket further includes a first bracket body coupled to the base frame, and wherein the primary springs are provided on the first bracket body, each primary spring being disposed toward a respective one of the cover pads, the first end of each primary spring being fixed to and integrated with the first bracket body, and the second end of each primary spring being deformable with a degree of freedom in the direction of the external force applied to the respective cover pad.

13. The cart of claim 12, wherein the primary springs face each other with the magnet mounting part interposed therebetween, and are pressurized in the direction of the external force by the magnet mounting part when at least one of the cover pads is moved in the direction of the external force.

14. The cart of claim 13, wherein the second moving bracket further includes a second bracket body coupled to the first moving bracket, and wherein the secondary springs are provided on the second bracket body, each secondary spring being disposed toward a respective one of the cover pads, the first end of each secondary spring being fixed to the second bracket body, and the second end of each secondary spring being deformable with a degree of freedom in the direction of the external force applied to the respective cover pad.

15. The cart of claim 14, wherein the second end of the secondary springs are provided in opposing directions and are connected to the magnet mounting part, and the secondary springs are pressurized in the direction of the external force by the magnet mounting part when at least one of the cover pads is moved in the direction of the external force.

16. The cart of claim 15, wherein a distance between each secondary spring and the magnet mounting part is larger than a distance between each primary spring and the magnet mounting part.

17. The cart of claim 16, wherein a distance between each secondary spring and the magnet mounting part is larger than a distance between each primary spring and the magnet mounting part.

18. The cart of claim 17, wherein the second moving bracket further includes a spring rib formed in a longitudinal direction of each secondary spring and protruded toward the cover pad.

* * * * *